(12) United States Patent
Chang

(10) Patent No.: US 7,944,434 B2
(45) Date of Patent: May 17, 2011

(54) MOUSE WITH GAIN WEIGHT MEANS

(75) Inventor: Yuan-Jung Chang, Hsinchuang (TW)

(73) Assignee: Dexin Corporation, Taipei Hsien (TW)

( * ) Notice: Subject to any disclaimer, the term of this patent is extended or adjusted under 35 U.S.C. 154(b) by 1294 days.

(21) Appl. No.: 11/513,076

(22) Filed: Aug. 31, 2006

(65) Prior Publication Data

US 2008/0055250 A1    Mar. 6, 2008

(51) Int. Cl.
*G09G 5/08* (2006.01)
(52) U.S. Cl. .......................... 345/163; 345/167; 345/166
(58) Field of Classification Search .................. 345/163, 345/167, 156–157
See application file for complete search history.

(56) References Cited

U.S. PATENT DOCUMENTS

| 5,486,845 | A  | * | 1/1996  | Chait       | 345/163 |
|-----------|----|---|---------|-------------|---------|
| 2006/0227108 | A1 | * | 10/2006 | Meyer et al. | 345/163 |
| 2007/0159461 | A1 | * | 7/2007  | Zhou        | 345/163 |

FOREIGN PATENT DOCUMENTS

TW    M283244    12/2005

* cited by examiner

*Primary Examiner* — Amr Awad
*Assistant Examiner* — Leonid Shapiro
(74) *Attorney, Agent, or Firm* — Rosenberg, Klein & Lee

(57) ABSTRACT

A mouse with gain weight means comprising a case, a cursor control unit, a plurality of keys, a housing, and a balancing weight component. The case has a circuit board disposed inside of the case and a plurality of balancing weight notches in the bottom of the case. The cursor control unit 2 is disposed in the circuit board and extends to the outside of the bottom of the case. Disposed on the case are the keys and the housing. The balancing weight component includes a plurality of balancing weight lumps installed in the balancing notches. The mouse of the present invention has the balancing weight lumps installed in the bottom of the case to make the mouse easier for the user to handle.

5 Claims, 2 Drawing Sheets

MOUSE WITH GAIN WEIGHT MEANS

BACKGROUND OF THE INVENTION

1. Field of the Invention

The present invention relates to a mouse with a gain weight means, and more particularly to a mouse having a balancing weight so that the mouse handles better.

2. Description of the Prior Art

A mouse with gain weight means was published in Taiwan patent T.W. M283244, "A mouse structure with adjustable gravity". The mouse comprised a case, a cursor control unit, a plurality of keys, a housing, and a balancing weight element. The case has a circuit board disposed inside the case. The cursor control unit is disposed in the circuit board and extends to the outside of the bottom of the case. The plurality of keys are disposed on the case. The balancing weight element is fixed in the case.

However, in the mouse structure of the prior art, the balancing weight element is fixed inside the top of the mouse. For this reason, when users use the mouse they will feel that the top of the mouse is heavy, and the bottom of the mouse is light. So the mouse of the prior is difficult to handle.

The inventor of the present invention recognizes the above shortage should be corrected and special effort has been paid to research this field. The present invention is presented with reasonable design and good effect to resolve the above problems.

SUMMARY OF THE INVENTION

It is a primary object of the present invention to provide a mouse with gain weight means, wherein the mouse has a balancing weight lump disposed in the bottom of a case of the mouse. Thereby, users can easily handle the mouse as they desire.

For achieving the objects stated above, the mouse with gain weight means comprises: a case with at least one circuit board disposed inside of the case and a plurality of balancing notches in the bottom of the case; a cursor control unit installed in the circuit board and extending to an outside of a bottom of the case; a plurality of keys disposed on the case; and a balancing weight component having a plurality of balancing weight lumps disposed in the plurality of balancing notches.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
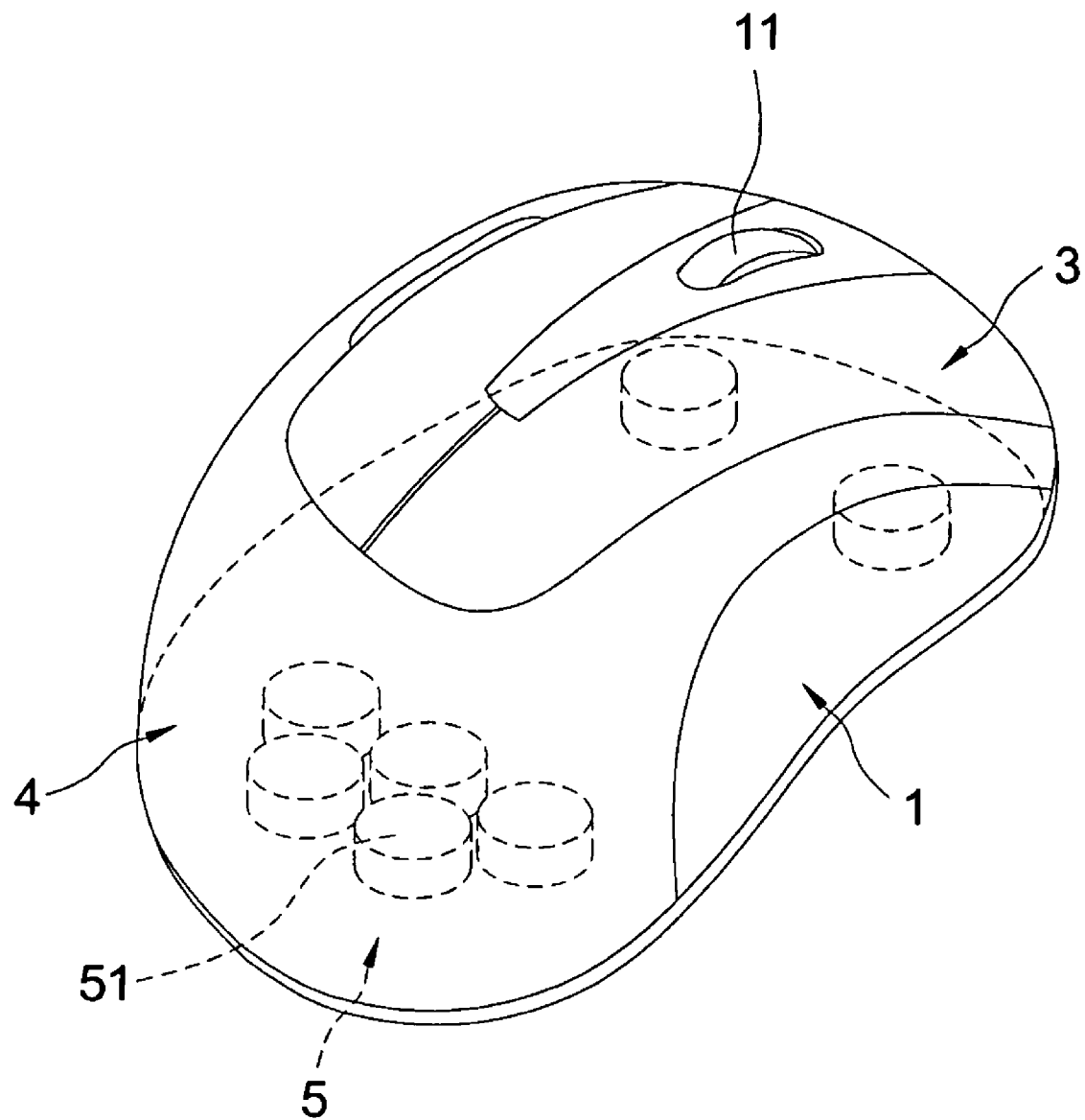
FIG. 1 is a perspective view of a mouse according to a preferred embodiment of the present invention.
Figure 2:
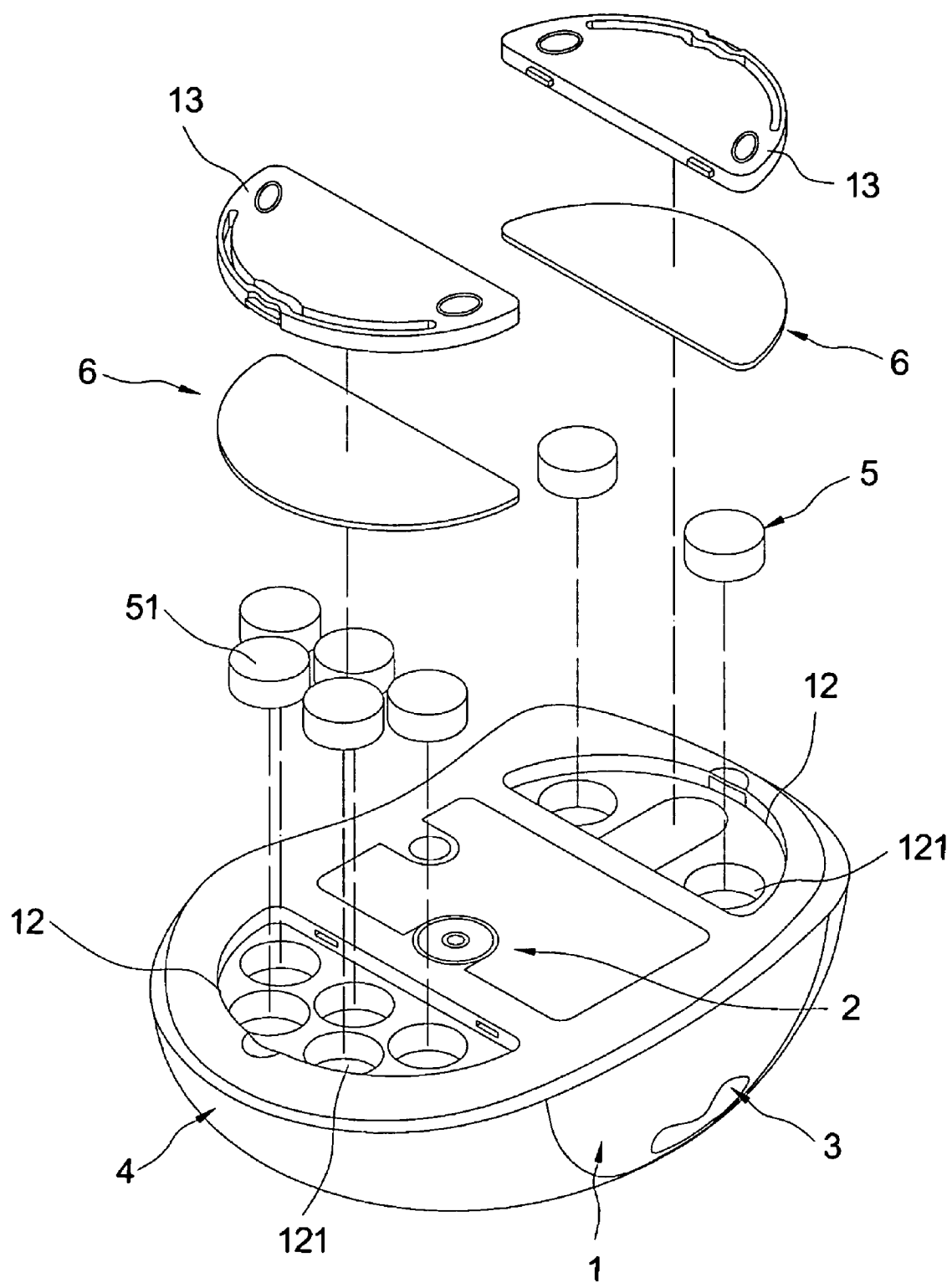
FIG. 2 is an exploded perspective view of a mouse according to a preferred embodiment of the present invention.

Reference is made to FIGS. 1 and 2, which show a perspective view and an exploded perspective view of a mouse according to a preferred embodiment of the present invention. The present invention provides a mouse with gain weight means comprising a case 1, a cursor control unit 2, a plurality of keys 3, a housing 4, and a balancing weight component 5.

The case 1 is made of a plastic and disposed on a circuit board (not shown) inside of the case 1. The cursor control unit 2 is an optical control device electrically connected to the circuit board. Furthermore, the cursor control unit 2 extends to an outside of a bottom of the case 1 to control the motion direction and distance of the mouse cursor. Additionally, the cursor control unit 2 can use a mechanical structure or any other kind of structure. The case further includes a roller electrically connected to the circuit board. Therefore a user can roll the roller to control the scrollable viewing area showed in a displayer.

The plurality of keys 3 are disposed on the case 1 and are electrically connected to the circuit board. A command, letter or picture of the function menu, an option or a button of the communication block, a turning of a page and accessing a quick menu, etc. are all selected by pressing the plurality of keys 3.

The housing 4 is made of a plastic and connected with the case 1 by screwing or wedging to dispose the housing 4 on the case 1. Because the mouse structure mentioned above is similar to the structure of the prior art, no longer explanation is required.

The case 1 has two balancing weight notches 12 and two covers 13. The balancing weight notches 12 are separately installed in the front and rear of the bottom of the case 1. Each of the balancing weight notches 12 has a plurality of circular containing notches 121 and is covered by the cover 13. The balancing weight component 5 includes a plurality of columns of balancing weight lumps 51 made of a metal or other heavy materials. The balancing weight lumps 51 are installed in the containing notches 121 of the balancing weight notches 12. The amount of the balancing weight lumps 51 can be adjusted according to the user's preferences. Furthermore, between the balancing weight lumps 51 and the cover 13 a gasket 6 is installed. The gasket 6 is an elastic buffer element and is used to avoid noise produced from the colliding of the balancing weight lumps 51 and the covers 13 when the user is using the mouse. The mouse with gain weight means of the present invention is made by the above-mention method.

In the present invention, the balancing weight lumps 51 are installed in the front and rear of the bottom of the case 1 to make the center-of-gravity of the mouse more stable. So when the user uses the mouse he or she will not feel the top of the mouse is heavy, and the bottom of the mouse is light. Thereby, the user can easily handle the mouse as they desire.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A mouse with gain weight means, comprising:
   a case with at least one circuit board disposed therein, the case having an opening formed on the bottom thereof, wherein a balancing-weight compartment is separably installed in the case from the bottom opening,
   wherein the balancing-weight compartment is concavely formed with a plurality of containing notches;

a cursor control unit installed on the circuit board extending to the outside of the bottom of the case;
a plurality of keys disposed on the case;
a balancing weight component including a plurality of balancing weight lumps matchingly disposable in the plurality of balancing notches of the balancing-weight compartment;
a cover covering the opening on the bottom of the case in a wedged way; and
a gasket made of elastic buffer material and disposed between the cover and the balancing weight lumps.

2. The mouse as claimed in claim 1, wherein the case has a housing.

3. The mouse as claimed in claim 2, wherein the housing connects with the case by screwing or wedging.

4. The mouse as claimed in claim 1, wherein the case has two openings, two balancing-weight compartments separably installed in the front and rear of the bottom thereof from the two openings, and two covers respectively wedged in the two openings, thereby a gravity of the mouse is adjustable by the two balancing-weight compartments.

5. The mouse as claimed in claim 1, wherein the cover is formed with a plurality of engaged protrusions from a periphery thereof for being wedged in the opening.

* * * * *